United States Patent
Shultz et al.

(10) Patent No.: US 6,455,951 B1
(45) Date of Patent: Sep. 24, 2002

(54) AUTO CHARGER FOR SYSTEM INCLUDING A HIGH VOLTAGE SUPPLY AND A LOW VOLTAGE SUPPLY

(75) Inventors: Gil Shultz, Northville, MI (US); Chris Shultz, Northville, MI (US)

(73) Assignee: Yazaki North America, Inc., Canton, MI (US)

( * ) Notice: Subject to any disclaimer, the term of this patent is extended or adjusted under 35 U.S.C. 154(b) by 152 days.

(21) Appl. No.: 09/639,335

(22) Filed: Aug. 16, 2000

(51) Int. Cl.[7] .................................................. B60L 1/00
(52) U.S. Cl. ..................................... 307/10.1; 307/10.8
(58) Field of Search ........................... 307/9.1, 18, 10.1, 307/25, 10.7, 28, 10.8, 29; 320/103

(56) References Cited

U.S. PATENT DOCUMENTS

| | | | |
|---|---|---|---|
| 4,492,912 A | 1/1985 | Nowakowski | |
| 5,021,727 A | 6/1991 | Mashino | |
| 5,233,229 A | * 8/1993 | Kohl et al. | 307/10.1 |
| 5,334,926 A | 8/1994 | Imaizumi | |
| 5,455,463 A | * 10/1995 | Langnickel et al. | 307/10.1 |
| 5,488,283 A | 1/1996 | Dougherty et al. | |
| 5,907,194 A | * 5/1999 | Schenk et al. | 180/65.1 |
| 5,986,431 A | 11/1999 | Hayes | |
| 6,229,279 B1 | * 5/2001 | Dierker | 307/10.1 |
| 6,232,674 B1 | * 5/2001 | Frey et al. | 307/10.1 |
| 6,320,358 B2 | * 11/2001 | Miller | 307/10.1 |
| 6,335,575 B1 | * 1/2002 | Reutlinger et al. | 307/10.1 |
| 6,384,489 B1 | * 5/2002 | Bluemel et al. | 307/10.1 |

OTHER PUBLICATIONS

"The 42–Volt Revolution," *Automotive Industries*, vol. 178, No. 8 (Aug. 1998).

* cited by examiner

*Primary Examiner*—Fritz Fleming
(74) *Attorney, Agent, or Firm*—Sughrue Mion, PLC

(57) ABSTRACT

A power supply system having a simple arrangement of connections between a load connected to a positive terminal of a high voltage battery via a pulse modulation control circuit and to and a positive terminal of a low voltage battery permits loading to be controlled throughout the system without damage or electromagnetic interference. The power supply system can accommodate low voltage loads on the high voltage subsystem to reduce conversion requirements for any DC/DC converter that is included in the power supply system. A charging controller regulates the amount of charge supplied to the high voltage and low voltage batteries.

20 Claims, 5 Drawing Sheets

AUTO CHARGER FOR SYSTEM INCLUDING A HIGH VOLTAGE SUPPLY AND A LOW VOLTAGE SUPPLY

BACKGROUND OF THE INVENTION

1. Field of Invention

The present invention relates to an apparatus that permits loads requiring low nominal voltages (such as automobile lights) and loads requiring high voltages (such as air conditioning units, power steering systems, rear-window defoggers, and valve trains) to co-exist in an automobile electronics system using a simple and inexpensive arrangement to supply the operating voltages.

2. Background of Related Art

New automobile systems commonly include both a high voltage source and a low voltage source. A typical nominal value for the high voltage source is 42V, while a typical nominal value for the low voltage source is 14V. The high voltage source is included to power those automobile components that require larger amounts of energy and to accommodate new features in automotive systems and controls. The low voltage source is also maintained in order to power conventional automobile devices which cannot handle the peak voltages and fluctuations that accompany the larger voltage source. For instance, the wire and filaments for conventional automobile lamps would burn out rapidly, sometimes explosively, if driven by a higher 42V battery. Such effects create unwanted system failures and safety concerns. Replacing the conventional low voltage lamp with a high voltage lamp is not presently a practical solution in view of the widespread use of the low voltage lamps throughout the automotive industry. Moreover, higher voltage lamps are characterized by longer and thinner filaments than those present in their low voltage counterparts. This makes high voltage lamps more fragile and susceptible to both mechanical and electrical damage and thus less suitable for automotive applications. Therefore, higher voltage automobile power systems must be able to supply both high and low voltage loads.

In order to permit both the high voltage and low voltage sources to co-exist, conventional devices require the use of a high capacity DC/DC converter as shown in FIG. 1. Referring to FIG. 1, an alternator/generator A charges a 42V battery. In order to convert the 42 volt supply voltage to a lower voltage, a DC/DC converter CV is connected to the positive terminals of the low and high voltage batteries in a common ground system (other configurations are also possible). A lamp L2 is switched on and off by a switch SW on the low voltage side of the circuit. As illustrated in FIG. 1, the assignee of the present application has also been able to operate some 12 V lamps L1 on a high voltage side of the circuit via a pulse width modulation circuit PWM. The high voltage side also includes a 42 V load operated by a switch. The high voltage load may comprise any form of resistive, reactive and inductive elements. The nature of this load does not significantly impact the conventional system or the invention. On the high voltage side of the system, since the lamps L1 draw a significant amount of the 42V from the high voltage source, the flickering and burn-out of these lamps may result. The difficulty of providing PWM control for many low voltage loads cannot sufficiently eliminate these effects. Moreover, the presence of the conventional DC/DC converter adds much to the weight and complexity of an automobile power distribution system. The converter is also a bulky piece of apparatus that detracts from the space available in the passenger cabin or otherwise adds to the size of the vehicle. Manufacturing costs also increase with the inclusion of a DC/DC converter. It is estimated that a DC/DC converter can cost as much as $1.00 per watt of conversion capacity. Currently, a typical minimum conversion requirement for automotive applications is on the order of 1000 Watts (1 kW), which adds significantly to vehicle design and manufacturing costs.

In lieu of the DC/DC converter, the system may alternatively include a separate alternator/generator for the low voltage supply source. However, this arrangement also includes many of the deficiencies of the DC/DC converter system in terms of space, weight, cost and complexity.

SUMMARY OF THE INVENTION

Applicant's invention overcomes the above deficiencies by eliminating or reducing the requirements for a complex and bulky DC/DC converter. Rather than having lamps directly driven by the high voltage source and having a low voltage battery charged by a DC/DC converter, the present invention alters the terminal connections between the high voltage battery, the low voltage battery, a pulse width modulation circuit and a load, which draws current. By connecting the load through a pulse width modulation circuit to a positive terminal of both the high voltage battery and also to the positive terminal of the low voltage battery, the voltage drop across lamps connected to the high voltage side of the battery can be reduced by the nominal amount of the low battery voltage. A typical value is 14 volts. Therefore, rather than drawing all 42V of a high voltage power source, the voltage drop across the lamps is reduced by 14V, and the 28 volts drawn by the lamps can be more easily managed using pulse width modulation techniques. Adequate charging of the high voltage source is provided by selection of an appropriate alternator.

Additionally, the manually operated load is connected in parallel via a switch with the 14V battery, permitting the battery to be charged even without the inclusion of a DC/DC converter. Should a small step up in energy in the 14V-system be necessary, this can be achieved with a more simplified arrangement and can also be achieved by running the PWM-operated lamps (loads) at below a luminance (operating) value. A similar effect can also be accomplished by creating a pseudo switch mode converter using the inductance of the connected inductive loads such as motors and or their resistance.

Detailed descriptions of the preferred embodiment of the invention will be described below with reference to the drawings, where:

DESCRIPTION OF THE PREFERRED EMBODIMENT

Figure 2:
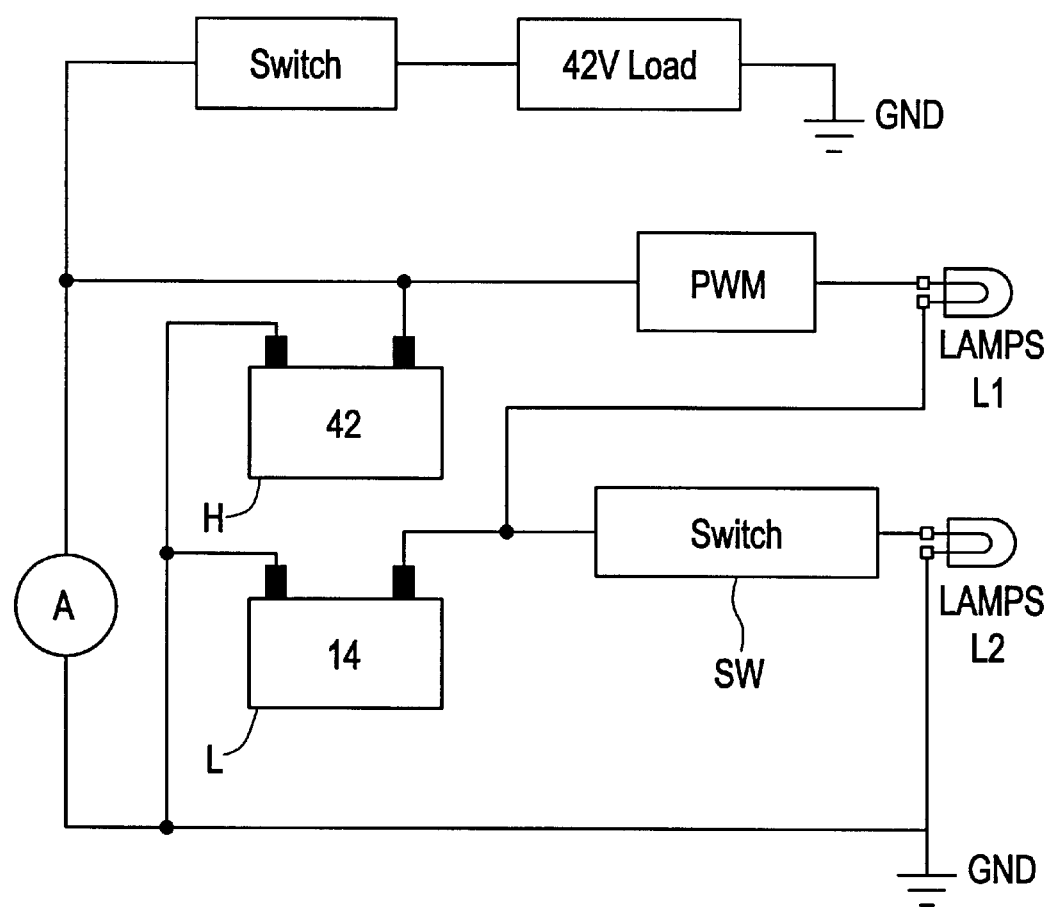
FIG. 2 illustrates an automotive voltage supply system according to a first embodiment of the invention.

Referring to FIG. 2, the present invention includes an alternator/generator A which charges a 42V high voltage source H. The positive terminal of the high voltage source is connected to a pulse width modulation circuit PWM for pulse-control modulation control of a set of automotive elements. Lamps L1 are examples of pulse-controlled elements, but the invention is not limited thereto and other loads may be connected at the high-voltage side. The lamps L1 are connected on one end to the PWM circuit and at another end to a positive terminal of a low voltage source L. A switch SW is also connected to the positive terminal of the low voltage source L to supply power to a lamp L2 in accordance with activation of the switch.

Figure 3:
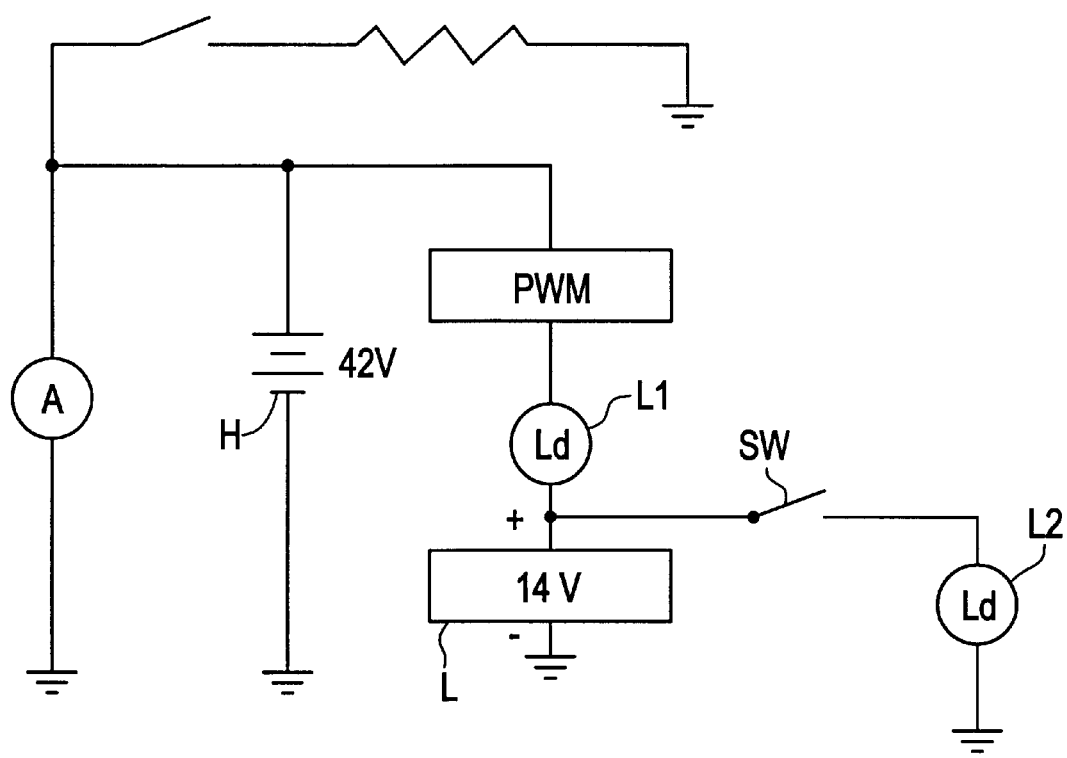
FIG. 3 illustrates an equivalent circuit of the voltage supplied to the high-voltage-side and low-voltage side-lamps according to the first embodiment of the present invention.

An equivalent form of the circuit arrangement of FIG. 2 is shown in FIG. 3. As is apparent from FIG. 3, the high voltage source H is connected in parallel across a branch including the PWM circuit, the lamps L1 and the low voltage source L. The low voltage source L is charged by the current flow to a 14 V (nominal) voltage level, leaving only 28 volts to be controlled and dissipated by the PWM circuit and lamps L1. The PWM control in such a circuit arrangement will permit easier implementation of features such as gradual dimming of vehicle lights from a luminous to a sub-illumination condition. In addition to simpler PWM modulation control, this system has the additional benefit of providing a significant reduction in inrush current over the conventional 42 V system. Though the nominal high and low voltages of 42 volts and 14 volts, respectively, are used to illustrate this embodiment, the invention is not limited thereto. Rather, these voltage values merely correspond to values under consideration by many standards-setting organizations. The high voltage battery may have an output in the range of 21–56 volts, and the low voltage battery may have an output in the range of 6–15 volts. Additionally, though lamps are illustrated as typical low voltage loads, the invention is not limited thereto.

Depending on the automotive components in the system, the low voltage source L may require an ancillary charging using a converter, but any requirements will be reduced from those of the conventional case. In particular, since low voltage loads on the high voltage side of the system dissipate some power, the difference in wattage between the high voltage side and the low voltage side will also be reduced by effectively twice the load, resulting in requirements for a less costly and complex converter. The particular converter requirements will depend on the loading configuration of the system. Significantly, the ability to use excess wattage on the high voltage side improves the efficiency of the overall electrical system as well as providing cost-reductions.

Figure 1:
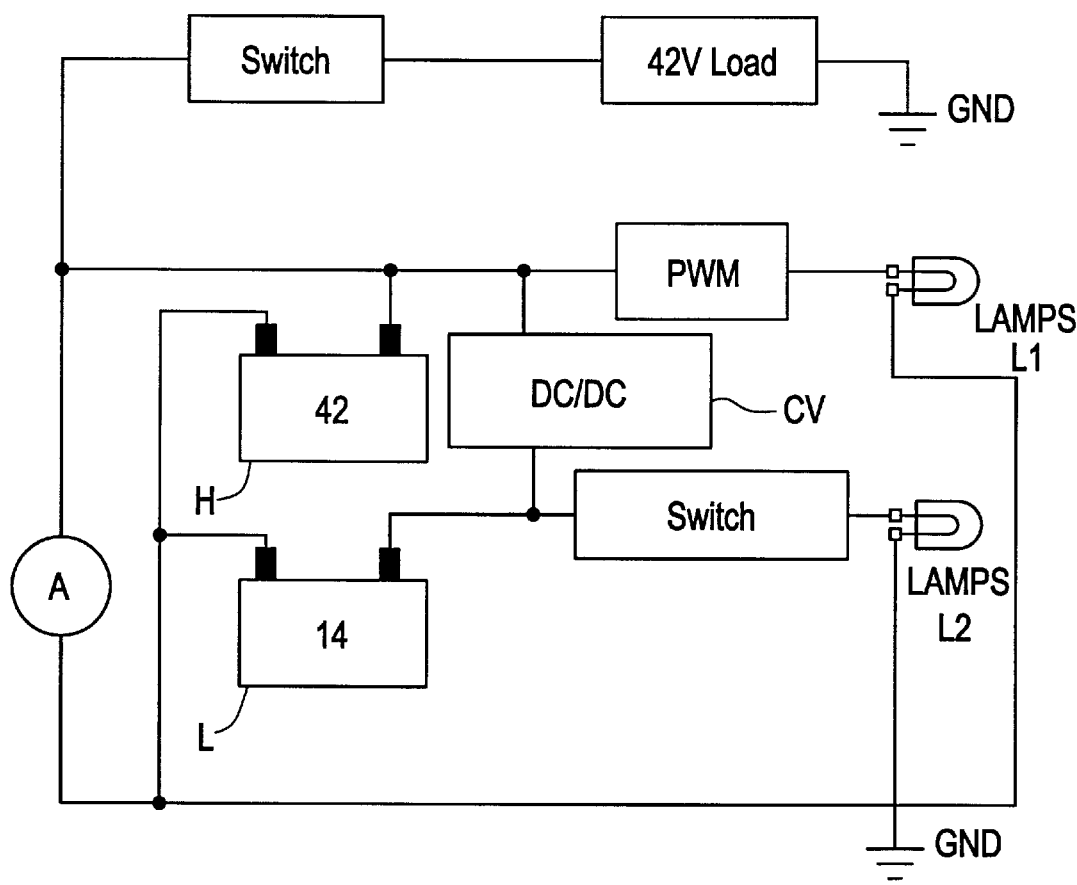
FIG. 1 illustrates a conventional automotive voltage supply system including high and low voltage sources.
Figure 4:
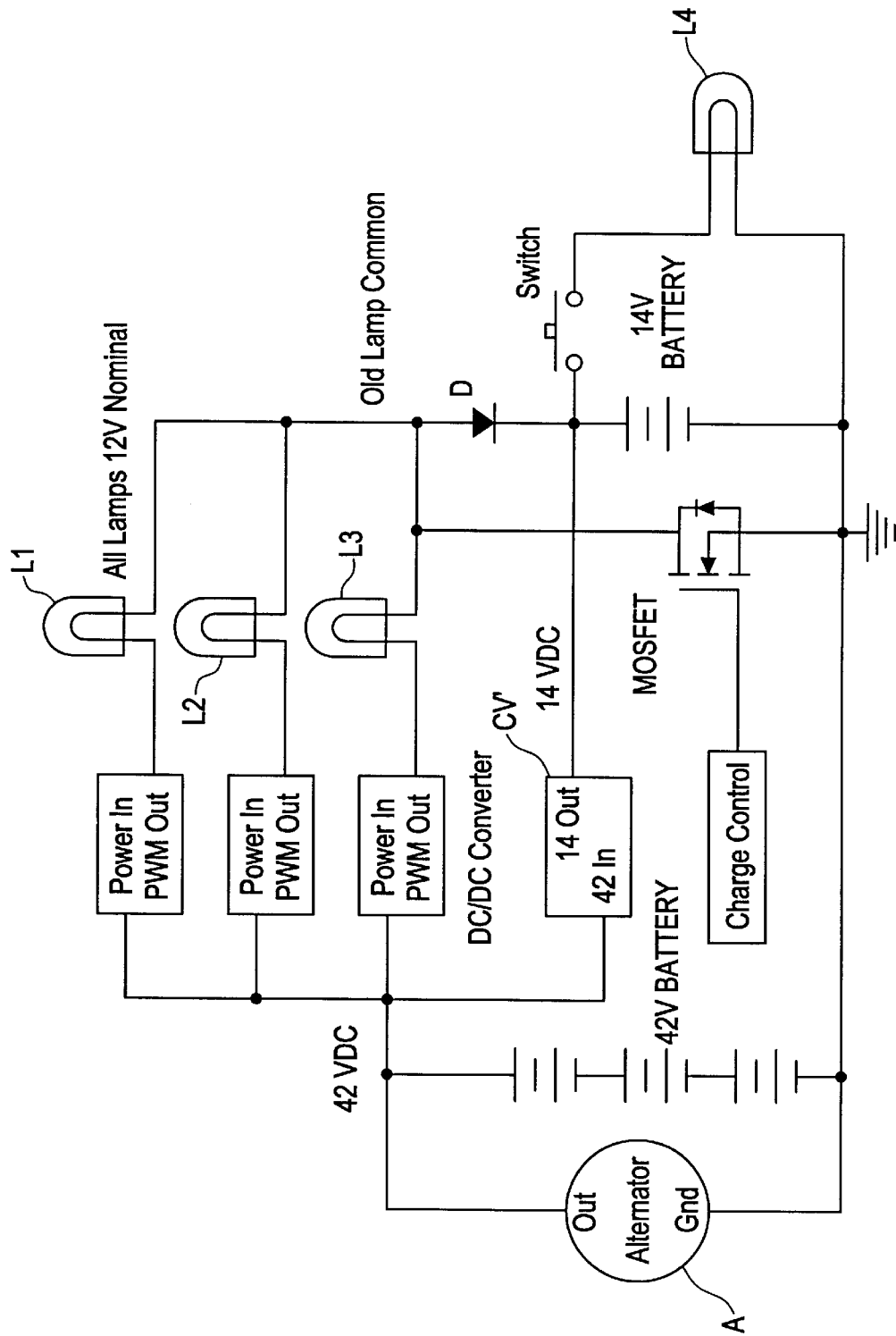
FIG. 4 illustrates an automotive voltage supply system according to a second embodiment of the invention.

FIG. 4 illustrates a second embodiment of the present invention which includes an auxiliary converter having reduced conversion requirements from that illustrated in FIG. 1. FIG. 4 includes two subsystems. The first subsystem comprises the 42V battery and alternator A. The second subsystem comprises the 14V battery and the DC/DC converter CV'. In conventional arrangements, such as that illustrated in FIG. 1, the 14V battery was charged by the DC/DC converter, which had to supply sufficient power to both charge the 14V battery and maintain the 12V loads. Also, as illustrated in FIG. 1, the low voltage lamps L1 connected on the high voltage side had a direct connection to common ground, resulting in the deficiencies detailed above, such as difficult PWM operations. According to the second embodiment of FIG. 4, a low voltage lamp L3 located on the high voltage side is connected to a positive terminal of the 14V battery through a diode D. As in the first embodiment, the voltage drop across the lamp (filament) is reduced from 42 V to 28 V, facilitating PWM control. Additionally, the rate of temperature rise of the filament is reduced by an order of magnitude which reduces the chance of breakage. As a further benefit, the peak current is reduced and the PWM control pulses may be longer.

Significantly, when the lamp L3 is moved to the high voltage side from the low voltage side of the system in the embodiment of FIG. 4, this also eases requirements on the DC/DC converter CV' by an amount that is twice the load of L3. Specifically, when L3 (having a nominal load of 50 Watts) is connected on the low voltage side, the 14 V battery supplies a voltage to the lamp L3, and the 50 Watts of energy is directly dissipated to the ground terminal. However, when the load L3 is connected to the high voltage system, as shown in FIG. 4, the lamp is connected to the positive terminal of the low voltage battery. In this situation, the 50 Watts is not dissipated directly to ground but passes 50 Watts into the 14 V subsystem. There are some losses, but they are not deemed to be significant. Therefore, not only is a 50 Watt requirement removed from the low voltage subsystem, but also 50 Watts of energy is imparted to the low voltage subsystem, which effectively reduces the conversion capacity on the DC/DC converter CV' by 100 Watts from the converter of FIG. 1. This effect is increased for each low voltage element moved from the low voltage to high voltage subsystem. It is apparent that it is possible to reduce the DC/DC converter requirements by several hundred watts using the second embodiment, resulting in significant cost savings. Additionally, with the relocation of elements from the low voltage side, the battery requirements on the low voltage side can be further reduced.

It should be understood that in the second embodiment, a 42V load may be connected in a parallel branch as shown in FIGS. 2 and 3. Other configurations are also possible. However, since the nature of the high voltage load does not affect the invention, those connections have been omitted from the discussion of this embodiment.

A shunting (isolating) diode D is placed in series with the lamp L3 and the positive terminal of the 14 V battery. The lamp L3 is then shunted to ground with a switching element, such as a MOSFET, when necessary. As vehicle systems develop over time, more loads will be connected to the 42 V subsystem, and conversely fewer loads will be connected to the 14 V system. This, in time, will reduce the requirements placed on the DC/DC converter to the point where it can eventually be eliminated. In this situation, it is possible to over charge the 14V battery causing damage to the vehicle and appropriate systems. By turning on the MOSFET, current may be shunted around the 14V system eliminating the charging effect. This then gives the charge control system the ability to control the charge level of the 14V system.

Figure 5:
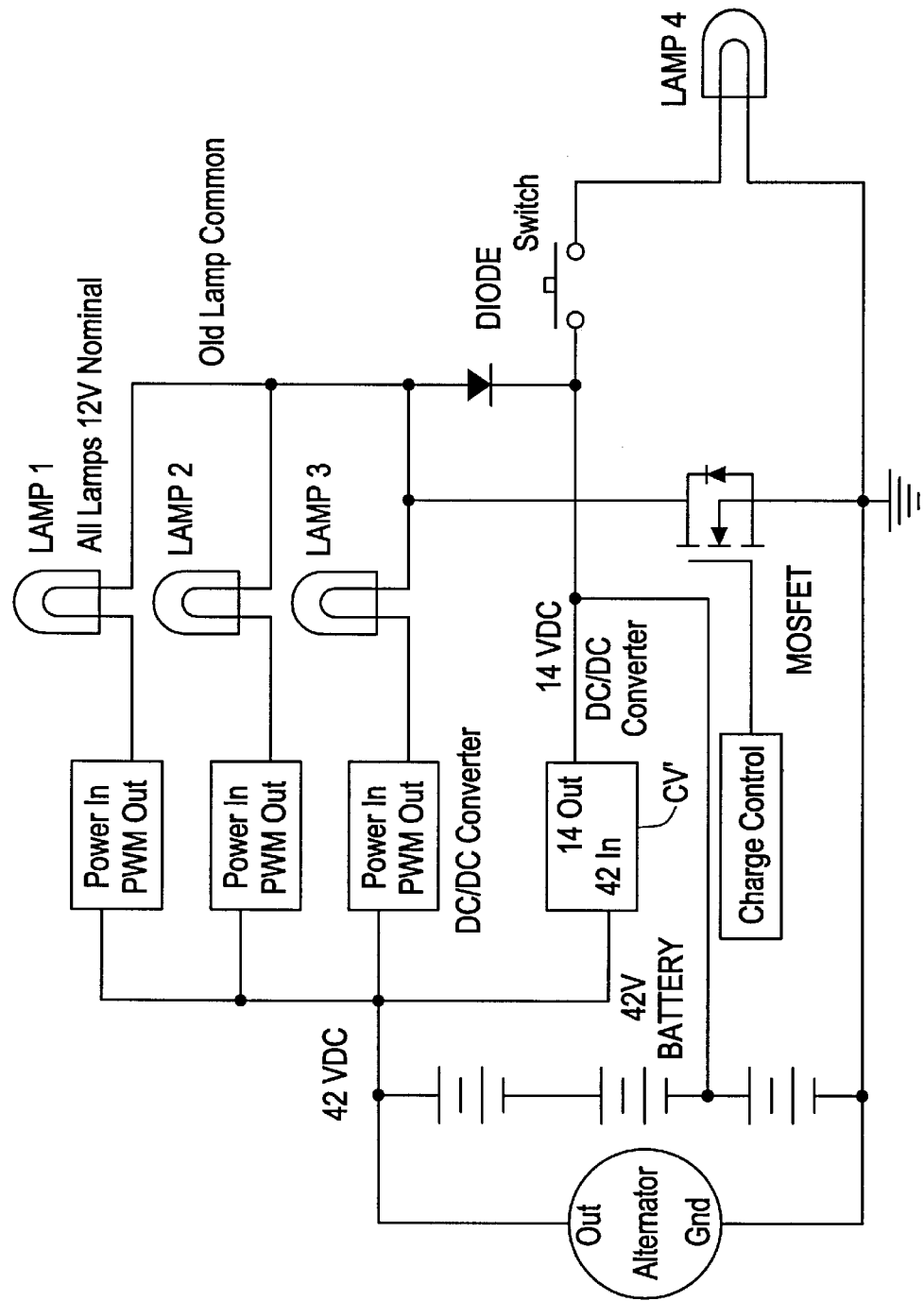
FIG. 5 illustrates an automotive supply system according to a second embodiment of the invention using an alternative circuit connection.

Another condition can occur where the 42 V subsystem has dropped below the voltage needed to operate the low voltage PWM loads such as headlamps. At this point, the MOSFET is turned on to effectively add an additional 14V VDC (low voltage battery voltage) to the reduced 42 V supply thereby allowing the PWM low voltage system loads to operate loads at full power. Via the charge control circuit, the MOSFET may also control the charging of the 14 VDC source by modulating the current flowing through the diode through the low voltage source to ground. FIG. 5 illustrates an alternative circuit arrangement for the second embodiment of the invention.

If active loads L1 (and L2, L3 in FIG. 4) do not allow sufficient current flow to the low voltage supply, the voltage drawn at these active loads can be reduced so that the voltage drop (charge) to the low voltage supply can be increased. This can be achieved by controlling the lamps L1 (and L2, L3 in FIG. 4) via the pulse width controller to be below a luminance value for example. Any residual current that is not applied to activate a load L1 would then flow for supplying current to the low voltage source for charging purposes. Brake lamps would be a good example for supplying current at a sub-illumination value. Upon application of a small incremental current, the brake lamps could then respond much faster to an increased current to reach the illuminated condition. The incremental current could be forced to slightly overshoot the fully-illuminated condition, creating an effect of greater perceived intensity (the Berkel effect) in the observer of the brake lamp. Both the reduced response time and the Berkel effect enhance safety. As an additional benefit of this arrangement, the application of a sub-illumination voltage to the lamps pre-heats the filaments making them less vulnerable to thermal stresses. This prolongs the life of the lamp. In particular, preheating of the lamp to approximately 3000° C. or greater substantially eliminates crystalline properties of the filament.

The system described above is characterized by a low cost and simple implementation. The common ground for both the high voltage source and the low voltage source permit reduced peak voltage requirements of switching semiconductors used in the system. Use of the pulse controls enables a large amount of channels to be supported. The arrangement is also more reliable than connecting several lamps in series (lamp manufacturers recommend against this), which still may not suppress the high voltage source effects sufficiently. The operational speed of the system is limited by hardware switching components, such as programmable gate arrays, timers, etc, rather than a power of a microcontroller used for PWM control. However, as microcontrollers increase in processing capacity and peripherals, PWM operations may be implemented in such controllers. The present embodiment reduces, and in most instances, eliminates the time-critical burden placed on the PWM microcontroller.

Though a preferred embodiment of the invention has been set forth above, the present invention is not limited thereto. Many modifications can be provided by one skilled in the art without departing from the spirit and the scope of the invention.

What is claimed is:

1. A power supply system comprising:
   a battery for a high voltage source;
   a battery for a low voltage source;
   a first load; and
   a pulse width modulation control unit,
   wherein a positive terminal of the battery for the high voltage source is connected to a positive terminal of the battery for the low voltage source through the pulse width modulation control unit and the first load.

2. The power supply system according to claim 1, further comprising:
   a switch; and
   a second load,
   wherein a first end of the switch is connected to the positive terminal of the battery for the low voltage source and a second end of the switch is connected to the second load.

3. The power supply system according to claim 1, wherein said pulse width modulation control unit applies a signal to supply current to the first load at a level where the first load is not activated to charge said battery for the low voltage source.

4. The power supply system according to claim 3, wherein said first load comprises a vehicle brake lamp.

5. The power supply system according to claim 1, wherein the first load is directly connected to the positive terminal of the battery for the low voltage source.

6. The power system according to claim 1, wherein the first load is a lamp rated for operation at a level corresponding to the low voltage source.

7. The power system according to claim 1, wherein the battery for the high voltage source outputs a voltage in a range of 21–56 volts and the battery for the low voltage source outputs a voltage in a range of 6–15 volts.

8. The power system according to claim 7, wherein the first load is a lamp rated for operation at a level corresponding to the low voltage source.

9. The power system of claim 1 further comprising a DC/DC converter connected to the positive terminal of the high voltage source and the positive terminal of the low voltage source.

10. The power supply system of claim 9 further comprising a diode directly connected between the first load and the positive terminal of the low voltage source.

11. The power supply system of claim 9 further comprising a switching element directly connected between the first load and ground.

12. The power supply system of claim 11, wherein the switching element is a MOSFET.

13. The power supply system of 11 further comprising a charge control element to activate said switching element to charge the low voltage source.

14. The power supply system of claim 9, wherein the DC/DC converter has a conversion factor of less than 800 Watts.

15. The power supply system of claim 13 further comprising a diode directly connected between the first load and the positive terminal of the low voltage source.

16. The power supply system of claim 12, further comprising a diode directly connected between the first load and the positive terminal of the low voltage source, and wherein the MOSFET directs current through the diode through the low voltage source to ground when there is a failure in at least one of a first component driven by said high voltage source and a second component driven by said low voltage source.

17. The power supply system of claim 16, wherein at said first component comprises an alternator.

18. The power supply system of claim 13, further comprising a diode directly connected between the first load and the positive terminal of the low voltage source wherein the charge control element activates said switching element to direct current through the diode through the low voltage source to ground when there is a failure in at least one of a first component primarily driven by said high voltage source and a second component primarily driven by said low voltage source.

19. The power supply system of claim 12, wherein the MOSFET directs current to flow from the first load through the MOSFET to ground when the battery for the low voltage source is fully charged.

20. The power supply system of claim 12, wherein said MOSFET modulates a current flowing from the first load through the low voltage source to ground.

* * * * *